Feb. 23, 1954      A. W. ELLCOCK      2,670,057

HYDROMECHANICAL BRAKING SYSTEM FOR ROAD VEHICLES

Filed Aug. 15, 1950      3 Sheets-Sheet 1

INVENTOR
ARTHUR W. ELLCOCK

BY *Ayates Dowell*
ATTORNEY

Feb. 23, 1954   A. W. ELLCOCK   2,670,057
HYDROMECHANICAL BRAKING SYSTEM FOR ROAD VEHICLES
Filed Aug. 15, 1950   3 Sheets-Sheet 2

INVENTOR
ARTHUR W. ELLCOCK
BY A. Yates Dowell
ATTORNEY

Feb. 23, 1954 A. W. ELLCOCK 2,670,057
HYDROMECHANICAL BRAKING SYSTEM FOR ROAD VEHICLES
Filed Aug. 15, 1950 3 Sheets-Sheet 3
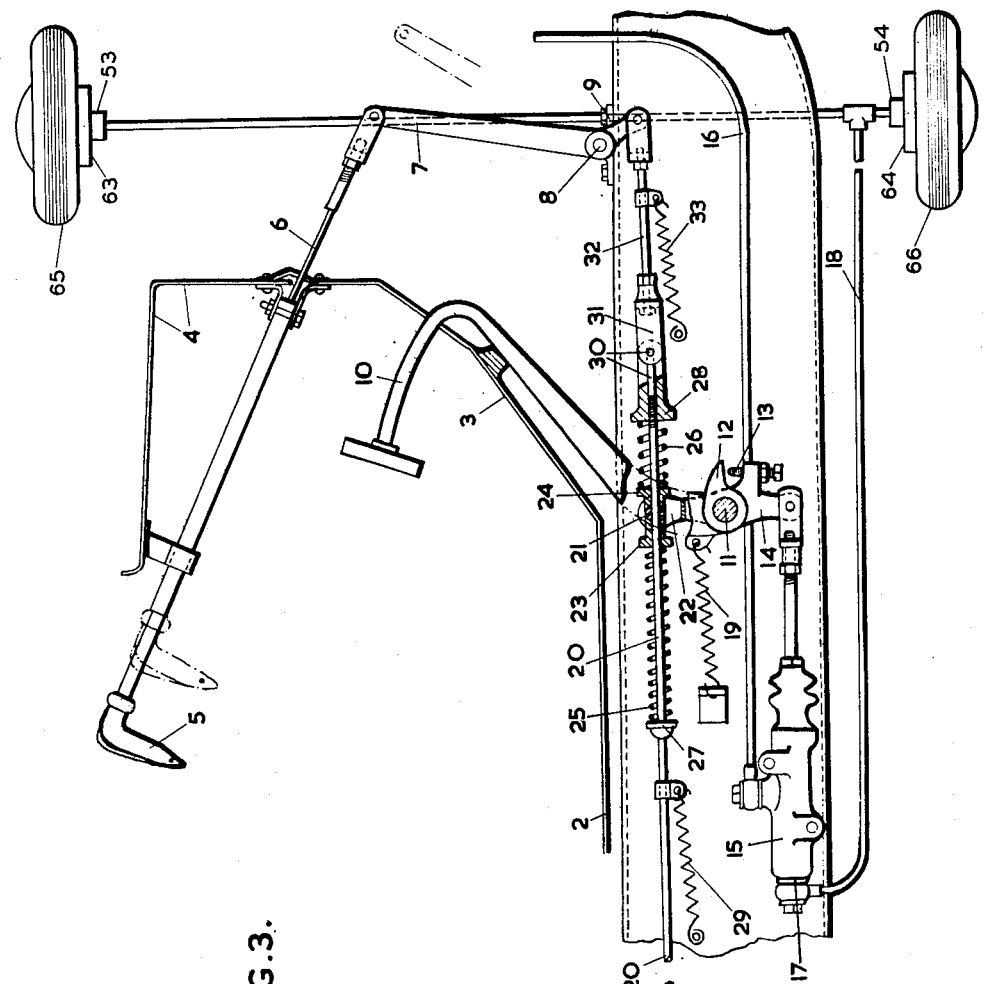
FIG.3.
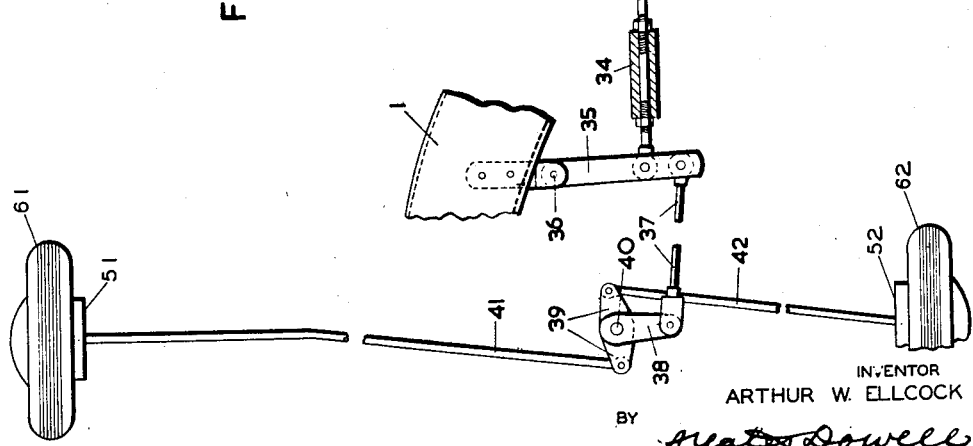
INVENTOR
ARTHUR W. ELLCOCK
BY
*A. Yates Dowell*
ATTORNEY Patented Feb. 23, 1954

2,670,057

UNITED STATES PATENT OFFICE 2,670,057

HYDROMECHANICAL BRAKING SYSTEM FOR ROAD VEHICLES

Arthur W. Ellcock, Barnt Green, near Birmingham, England, assignor to The Austin Motor Company Limited, Northfield, Birmingham, England Application August 15, 1950, Serial No. 179,507

2 Claims. (Cl. 188—10)

The invention relates to hydro-mechanical braking systems for road vehicles, that is to say systems in which the brakes of one pair of road wheels, usually the front wheels, are operated hydraulically and those of the other or rear pair are operated mechanically.

In a known braking system of this kind in which the front brakes are operated hydraulically and the rear brakes mechanically, actuation of the foot pedal has the effect of applying both sets of brakes simultaneously through the medium of a compensating lever, and the actuation of the hand brake has effected full and positive application of the rear brakes and light application of the front brakes.

In a hydro-mechanical braking system according to the present invention, actuation of one brake control, preferably the foot brake, has the effect of positively applying the hydraulic brakes and of applying the mechanical brakes through resilient means so as to afford a progressively increasing proportion of hydraulic braking to mechanical braking with increasing brake applying pressure on said control.

According to a further feature of the invention, actuation of one brake control, preferably the hand brake, has the effect of positively applying the mechanical brakes, as before, and, through secondary resilient means, of lightly applying the hydraulic brakes, irrespective of the degree of application of the mechanical brakes. The secondary means operate to maintain a substantially constant light fluid pressure in the hydraulic system and consequent constant light braking pressure on the hydraulic brakes, when the hand brake is applied, irrespective of variations in the volume of the liquid due to temperature changes.

The invention will now be described with reference to the embodiment shown, by way of example, in the accompanying drawings, in which:

Fig. 3 is a similar view to Fig. 2 but showing the hand brake applied.

Figure 1:
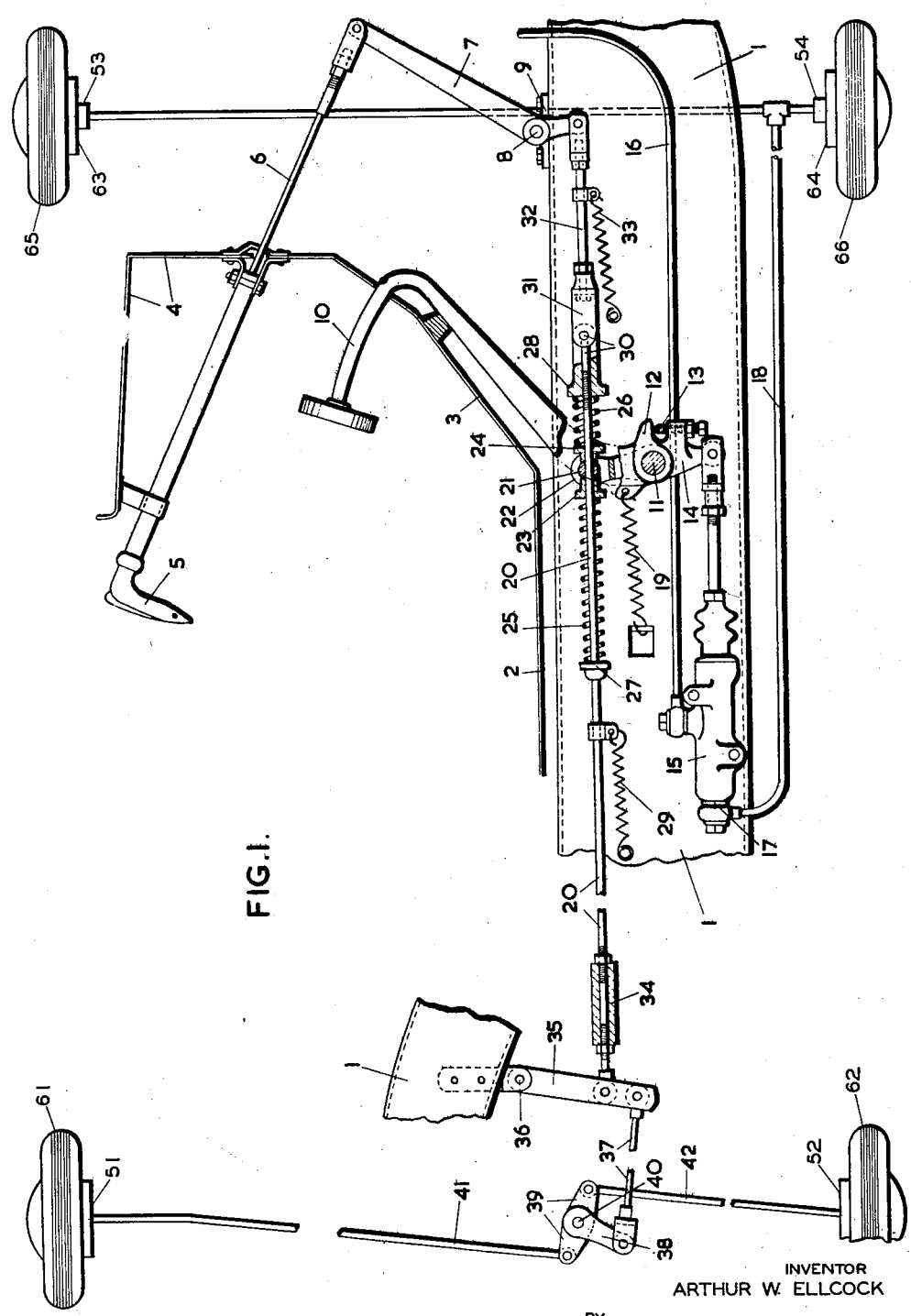
Fig. 1 is a side elevation, partly in section, of the hydro-mechanical braking system, the parts being in their normal or inoperative positions.

Referring to the drawings, in which like parts are given the same reference numbers in all the figures, I is the chassis frame of the vehicle, 2 is the floor of the vehicle body, 3 is the toe-board, and 4 is part of the scuttle or dash structure of the vehicle body. The hand brake control 5 is of the pull-up pistol grip type which, through a cable 6, operates a double-ended lever 7 mounted by a pivot 8 in a bearing 9 on the chassis 1, while the foot brake control is a pedal lever 10 mounted to pivot on a shaft 11 fixed to the chassis 1.

The pivotal boss of the pedal lever 10 has a radially extending and laterally offset nose portion 12 affording an abutment for co-operation with an adjustable screw abutment 13 on a forwardly extending portion of the lower arm of a two-armed lever 14 which is also pivoted on the shaft 11 immediately alongside the pedal lever 10. The lower arm of this lever 14 is directly connected to the ram of the usual hydraulic master braking cylinder 15 which is maintained replete with working fluid by way of a supply pipe 16 from a reservoir (not shown) and has its pressure outlet 17 connected by a pressure pipe line 18 to the front wheel brake actuating cylinders 53, 54, of front wheel brakes 63, 64 of front wheels 65, 66 in the usual manner. The pedal lever 10 is held up by a tension spring 19 anchored to the chassis, and normally, as seen in Fig. 1, there is a small clearance between the abutments 12 and 13 to allow a certain amount of free movement for the pedal lever 10 before it positively actuates the lever 14 to apply the hydraulic brakes associated with the front wheels.

The upper arm of the lever 14 is bifurcated and straddles a movable element or pull rod 20 which slides through a diametrical hole in a transverse pin 21 which is turnable in bearing eyes 22 afforded by the bifurcations of said lever 14. Two collars 23, 24, slidably mounted on the pull rod 20 and on opposite sides of the transverse pin 21 are operated upon by opposed helical compression springs 25, 26 which are sleeved over the pull rod 20 and at their remote ends bear against fixed abutments 27, 28 respectively, which latter abutments are fixed on the rod 20 which is loaded rearwardly by a tension spring 29 anchored to the chassis 1, while the forward abutment member 28 has a pin-and-slot lost motion connection 30 with a forked member 31 on a rod 32 connected to the shorter arm of the hand-brake lever 7, which rod 32 is also loaded rearwardly by a spring 33 anchored to the chassis 1. The rear end of the rod 20 is connected through a turnbuckle 34 to a lever 35 which depends freely from a fixed pivot 36 on the chassis 1 and operates, through a rod 37 and lever arm 38, a double-ended lever 39 which turns about a vertical axis 40 and has its ends connected by laterally extending actuating rods 41, 42 to the mechanical brakes 51, 52 of the left and right hand rear wheels 61 and 62 respectively. In the drawings the parts 37, 38, 39, 40, 41, 42, 51, 52, 61 and 62 are shown as they would be seen in plan, for the sake of clearness, and not in side elevation as they should really be drawn. This rear end portion of the rear brake system is in accordance with ordinary or usual practice.

The springs 25, 26 are of different strengths, the stronger spring 26 being forwardly of the pin 21 and, through the sliding collar 24, pressing it rearwardly against the action of the opposing lighter spring 25 acting upon the pin 21 through the collar 23.

Figure 2:
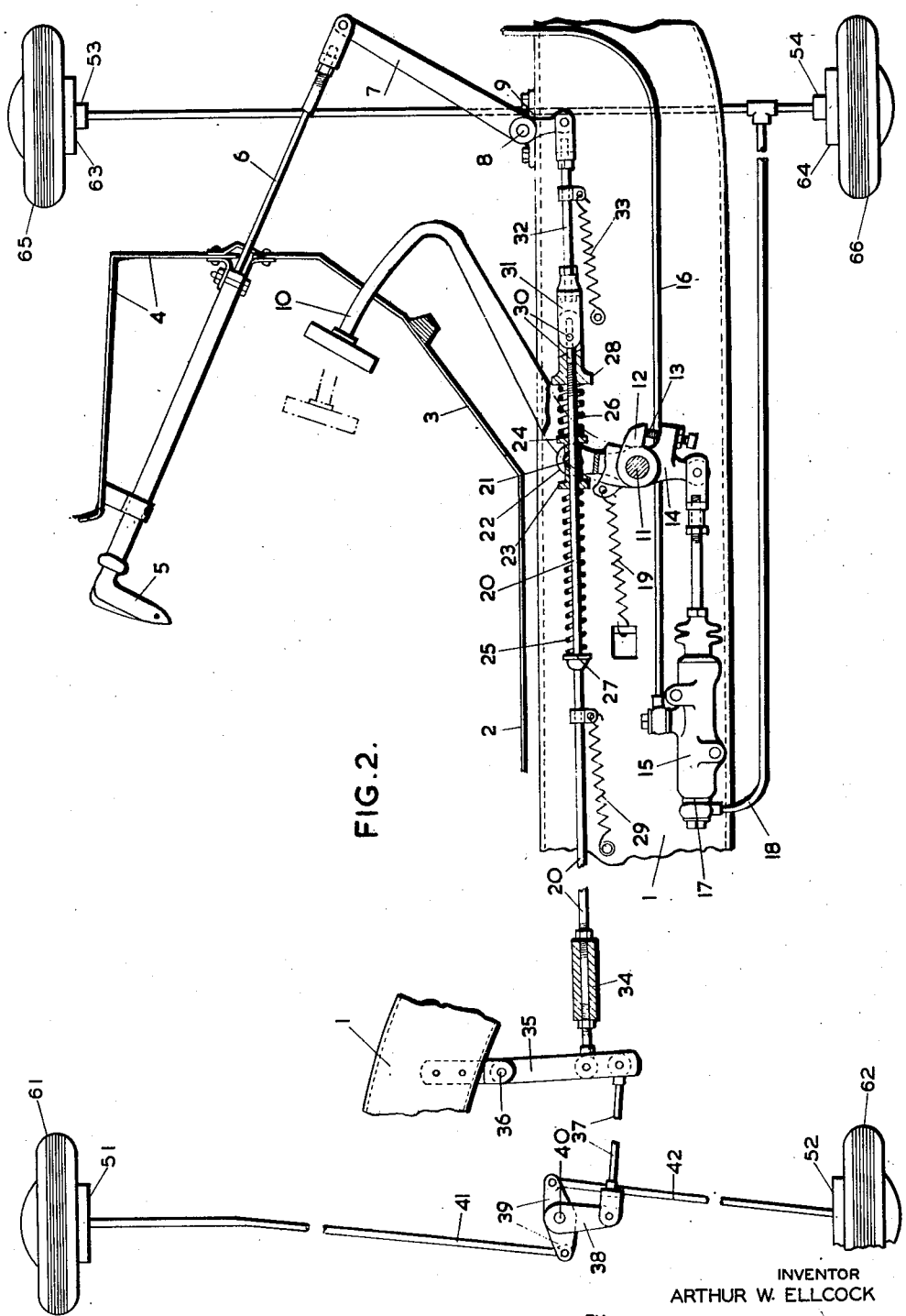
Fig. 2 is a similar view to Fig. 1 but showing the foot brake applied.

When the hydraulic brakes are positively applied by depressing the pedal 10 the forward movement of the upper end of the lever 14, carrying the transverse pin 21, is transmitted by the stronger spring 26 and the abutment member 28 to the rod 20 so as to apply the mechanical rear brakes and as the brake-applying pressure on the pedal 10 is increased the spring 26 operates to afford a progressively increasing proportion of hydraulic braking to mechanical braking (see Fig. 2). Thus under normal braking conditions the foot brake provides the greater braking effort at the front wheels and also for automatic increase in front wheel braking in proportion to back wheel braking as forward weight transference takes place with increasing deceleration.

When the hand brake is put on the rear brakes are directly and positively applied through the rod 20 and the associated mechanical linkage once the lost motion has been taken up. The forward movement of the rod 20, with its abutments 27, 28, relieves the spring 26 and causes the compression of the spring 25 to be so increased as to push the pin 21 forwardly somewhat to create and maintain a constant light application of the hydraulic brakes irrespective of the degree of application of the mechanical brakes and irrespective of variations in volume of the brake fluid due to temperature changes.

Having fully described my invention, what I claim and desire to secure by Letters Patent is:

1. A hydro-mechanical braking system for a road vehicle having front and rear pairs of wheels, comprising in combination hydraulically applied brakes for a front pair of road wheels, a hydraulic master cylinder for operating said brakes and having its ram actuated by a lever, a pedal lever adapted to cooperate with said actuating lever to apply the hydraulic brakes positively, mechanically applied brakes for a rear pair of road wheels, a pull rod operated by a hand control for positively applying the mechanical brakes, a sliding pivotal connection between said actuating lever and said pull rod, and opposed springs on said pull rod and operating between said sliding pivotal connection and abutments on said pull rod, one spring being stronger than the other and operating, when the hydraulic brakes are positively applied, to apply the mechanical brakes so as to afford a progressively increasing proportion of hydraulic braking to mechanical braking with increasing brake-applying pressure on the pedal lever, the weaker spring, when the mechanical brakes are positively applied, operating to apply the hydraulic brakes lightly and maintain such light application irrespective of the degree of application of the mechanical brakes.

2. A braking system comprising a vehicle having front and rear wheels, hydraulically actuated brakes for some of said wheels and mechanically actuated brakes for the other of said wheels, an operating lever on said vehicle, a master cylinder actuatable from said lever having communication with said hydraulically actuated brakes, a rod slidably engaging said lever connected to said mechanical brakes for actuating said mechanical brakes, abutments on said rod spaced from said lever on opposite sides thereof, and springs between said abutments and said lever whereby when said lever is manually operated said hydraulic brakes are positively applied and said mechanical brakes are resiliently applied through one of said springs, and a manual control having a lost motion connection with said rod for applying said mechanical brakes positively and resiliently applying said hydraulic brakes through the other of said springs.

ARTHUR W. ELLCOCK.

References Cited in the file of this patent

UNITED STATES PATENTS

| Number | Name | Date |
|---|---|---|
| Re. 19,469 | Christenson | Feb. 19, 1935 |
| 1,743,367 | Maybach | Jan. 14, 1930 |
| 1,852,287 | Bragg et al. | Apr. 5, 1932 |
| 1,883,588 | Crane | Oct. 18, 1932 |
| 2,156,127 | Roberts | Apr. 25, 1939 |
| 2,262,829 | Brock | Nov. 18, 1941 |